United States Patent
Lu

(10) Patent No.: US 10,012,963 B2
(45) Date of Patent: Jul. 3, 2018

(54) SMART HOUSEHOLD APPLIANCE, MOBILE COMMUNICATION DEVICE, SYSTEM AND METHOD FOR CONTROLLING SMART HOUSEHOLD APPLIANCE

(71) Applicants: THROUGHTEK CO., LTD., Taipei (TW); THROUGHTEK TECHNOLOGY (SHENZHEN) CO., LTD., Shenzhen (CN)

(72) Inventor: Kai-Ye Lu, Taipei (TW)

(73) Assignees: Throughtek Technology (Shenzhen) Co., Ltd., Shenzhen (CN); Throughtek Co., Ltd., Taipei (TW)

( * ) Notice: Subject to any disclaimer, the term of this patent is extended or adjusted under 35 U.S.C. 154(b) by 218 days.

(21) Appl. No.: 14/331,457

(22) Filed: Jul. 15, 2014

(65) Prior Publication Data

US 2016/0020918 A1  Jan. 21, 2016

(51) Int. Cl.
| | |
|---|---|
| *G06F 15/16* | (2006.01) |
| *G05B 15/02* | (2006.01) |
| *H04L 12/28* | (2006.01) |
| *G05B 19/042* | (2006.01) |

(52) U.S. Cl.
CPC ......... *G05B 15/02* (2013.01); *G05B 19/0423* (2013.01); *H04L 12/2818* (2013.01); *H04L 12/2834* (2013.01); *G05B 2219/23051* (2013.01); *G05B 2219/25289* (2013.01); *G05B 2219/2613* (2013.01); *G05B 2219/2642* (2013.01); *H04L 2012/2841* (2013.01)

(58) Field of Classification Search
USPC ................................ 709/217, 220, 223, 227
See application file for complete search history.

(56) References Cited

U.S. PATENT DOCUMENTS

| | | | | |
|---|---|---|---|---|
| 2012/0172027 | A1* | 7/2012 | Partheesh | H04W 4/021 455/420 |
| 2013/0331087 | A1* | 12/2013 | Shoemaker | H04L 67/125 455/420 |
| 2013/0338839 | A1* | 12/2013 | Rogers | G05D 23/1917 700/278 |
| 2014/0244048 | A1* | 8/2014 | Ramachandran | G05D 23/1905 700/278 |
| 2014/0362991 | A1* | 12/2014 | Ebrom | H04W 12/04 380/270 |

\* cited by examiner

*Primary Examiner* — Joseph E Avellino
*Assistant Examiner* — Marshall McLeod
(74) *Attorney, Agent, or Firm* — Rosenberg, Klein & Lee

(57) ABSTRACT

The invention provides a system and method for controlling smart household appliance. The system comprises a router, at least one smart household appliance, and at least one mobile communication device configured with an application program. The application program of the mobile communication device is connected to the smart household appliance in a LAN or WAN connection mode. The smart household appliance records the connection mode between each application program and the smart household appliance to generate a connection information. If the connection information indicates that there is not any application program connected to the smart household appliance in LAN connection mode, the application program of the mobile communication device will send a disable signal to the smart household appliance from a remote end to turn off the smart household appliance so that the energy consumption of the smart household appliance may be reduced when nobody is at home.

10 Claims, 4 Drawing Sheets

SMART HOUSEHOLD APPLIANCE, MOBILE COMMUNICATION DEVICE, SYSTEM AND METHOD FOR CONTROLLING SMART HOUSEHOLD APPLIANCE

FIELD OF THE INVENTION

The present invention is related to a system and method for controlling smart household appliance, more particularly to a system and method for remotely controlling the power of the smart household appliance.

BACKGROUND

In the past, a smart household appliance control system needs large sensor devices to sense people's moves and acts, for example, infrared-ray distance detectors, infrared-ray motion sensors, image shifting detectors, etc. These sensor devices may transmit some sense data to a central control device. The central control device analyzes these sense data by means of algorithms to recognize whether anyone is at home or not, and therefore it sends a control signal to the smart household appliance to turn on or turn off the power of the smart household appliance.

However, these sensor devices disposed in the smart household appliance control system will spend a lot of hardware costs and destroy the aesthetic of home interior when they are embedded into home decor or household appliance, in such reasons that the smart household appliance control system is unable to popularize and develop quickly.

For those reasons, the present invention provides a smart household appliance control system without requiring the sensor devices, which can not only decrease the hardware costs, but also detect whether anyone is at home to remotely control the power of the smart household appliance, it is the object to be achieved by the present invention.

SUMMARY OF THE INVENTION

It is one object of the present invention to provide a system for controlling smart household appliance, in which comprises a router, at least one smart household appliance, and at least one mobile communication device. The mobile communication device can be connected to the specific smart household appliance by the using of an application program. The smart household appliance records that each application program is connected to the smart household appliance in a local area network connection mode or a wide area network connection mode to generate a connection information and transmit the connection information to the mobile communication device. When the application program of the mobile communication device determines that there is not any application program connected to the smart household appliance in the local area network connection mode according to the indication of the connection information, which will be recognized as nobody at home. Afterward, the application program of the mobile communication device will send a disable signal to the smart household appliance to turn off the power of the smart household appliance. Thereby, the application program of the mobile communication device is able to control the power of the smart household appliance, remotely, such that the energy consumption of smart household appliance will be reduced when nobody is at home.

It is one object of the present invention to provide a system and method for controlling smart household appliance, in which the number of configuration of the application programs in system is set in the application program of each mobile communication device, and the process module of the smart household appliance records the number of connection of the application programs and the connection mode between the application program of each mobile communication device and the smart household appliance to generate a connection information. When the application program of the mobile communication device determines that the number of connection of the application programs is equal to the number of configuration of the application programs and all application programs are connected to the smart household appliance in the wide area network connection mode according to the indication of connection information, it will send a disable signal to the smart household appliance to turn off the power of the smart household appliance. Accordingly, the application program of the mobile communication device may turn off the power of the smart household appliance after recognizing that the application programs of all mobile communication devices are connected to the smart household appliance by WAN connection mode.

To achieve above objects, the present invention provides a system for controlling smart household appliance, comprising: a regional network, comprising: a router having wireless and wired connection functions; and at least one smart household appliance, comprising a first local area network module and a process module, the smart household appliance connected to the router via the first local area network module; and at least one mobile communication device, comprising a second local area network module and a wide area network module, and configured with an application program, the mobile communication device connected to the router via the second local area network module so as to the application program of the mobile communication device connected to the smart household appliance in a local area network connection mode when the mobile communication device located within the wireless communication range of the router, the mobile communication device connected to the router via the wide area network module so as to the application program of the mobile communication device connected to the smart household appliance in a wide area network connection mode when the mobile communication device located outside the wireless communication range of the router; wherein the process module of the smart household appliance is for recording the connection mode between each application program and the smart household appliance to generate a connection information and transmit the connection information to the mobile communication device, when the application program of the mobile communication device determines that there is not any application program connected to the smart household appliance in the local area network connection mode according to the connection information, it will send a disable signal to the smart household appliance to turn off the power of the smart household appliance.

In one embodiment of the present invention, wherein when the application program of the mobile communication device determines that there is at least one application program connected to the smart household appliance in the local area network connection mode according to the connection information, it will send an enable signal to the smart household appliance to turn on the power of the smart household appliance.

In one embodiment of the present invention, wherein the number of configuration of the application programs in the system is set in the application program of each mobile communication device, the process module of the smart household appliance is for recording the number of connection of the application programs in the connection information, when the application program of the communication device determines that the number of connection of the application programs are equal to the number of configuration of the application programs and all application programs are connected the smart household appliance in the wide area network connection mode according to the connection information, it will send the disable signal to the smart household appliance.

In one embodiment of the present invention, wherein when the application program of the mobile communication device determines that the number of connection of the application programs are not equal to the number of configuration of the application programs according to the connection information, it will send the enable signal to the smart household appliance.

In one embodiment of the present invention, wherein the first local area network module and the second local area network module are wireless network modules, wired LAN network modules or short-distance communication network modules.

In one embodiment of the present invention, wherein the wide area network module is 3G、4G、GSM, GPRS network module or long-distance communication network module.

The present invention further provides a method for controlling smart household appliance applied in a smart household appliance control system, the smart household appliance control system comprising a router, at least one smart household appliance, and at least one mobile communication device configured with an application program, the smart household appliance connected to the router via the local network to form a regional network, the steps of the method comprising: establishing the connection between the application program of each mobile communication device and the smart household appliance in a local area network connection mode or in a wide area network connection mode; recording the connection mode between the application program of each mobile communication device and the smart household appliance to generate a connection information; and determining whether there is at least one the application program connected to the smart household appliance in the LAN connection mode according to the connection information, if it hasn't, the application program of the mobile communication device will send a disable signal to the smart household appliance to turn off the power of the smart household appliance.

In one embodiment of the present invention, wherein the application program of the mobile communication device will be connected to the smart household appliance in the local area network connection mode when the mobile communication device is located within the wireless communication range of the router, and the application program of the mobile communication device will be connected to the smart household appliance in the wide area network connection mode when the mobile communication device is located outside the wireless communication range of the router.

The present invention further provides another method for controlling smart household appliance applied in a smart household appliance control system, the smart household appliance control system comprising a router, at least one smart household appliance, and at least one mobile communication device configured with an application program, the smart household appliance connected to the router via the local network to form a regional network, the steps of the method comprising: setting the number of configuration of the application programs in the application program of each communication device; establishing the connection between the application program of each mobile communication device and the smart household appliance in a local area network connection mode or in a wide area network connection mode; recording the number of connection of the application programs and the connection mode between the application program of each mobile communication device and the smart household appliance to generate a connection information; and determining whether the number of connection of the application programs is equal to the number of configuration of the application programs and all application programs are connected to the smart household appliance in the WAN connection mode according to the connection information, if it is, the application program of the mobile communication device will send a disable signal to the smart household appliance to turn off the power of the smart household appliance.

The present invention further provides a smart household appliance, comprising a process module, connected to at least one mobile communication device configured with an application program in a local area network connection mode or a wide area network connection mode, wherein the process module of the smart household appliance is for recording the connection mode between each application program and the smart household appliance to generate a connection information and transmit the connection information to the mobile communication device, when the application program of the mobile communication device determines that there is not any application program connected to the smart household appliance in the local area network connection mode according to the connection information, it will send a disable signal to the smart household appliance to turn off the power of the smart household appliance.

The present invention further provides a mobile communication device, comprising an application program used for connecting to at least one smart household appliance having a process module in a local area network connection mode or a wide area network connection mode, wherein the process module of the smart household appliance is for recording the connection mode between each application program and the smart household appliance to generate a connection information and transmit the connection information to the mobile communication device, when the application program of the mobile communication device determines that there is not any application program connected to the smart household appliance in the local area network connection mode according to the connection information, it will send a disable signal to the smart household appliance to turn off the power of the smart household appliance.

DETAILED DESCRIPTION

Figure 1:
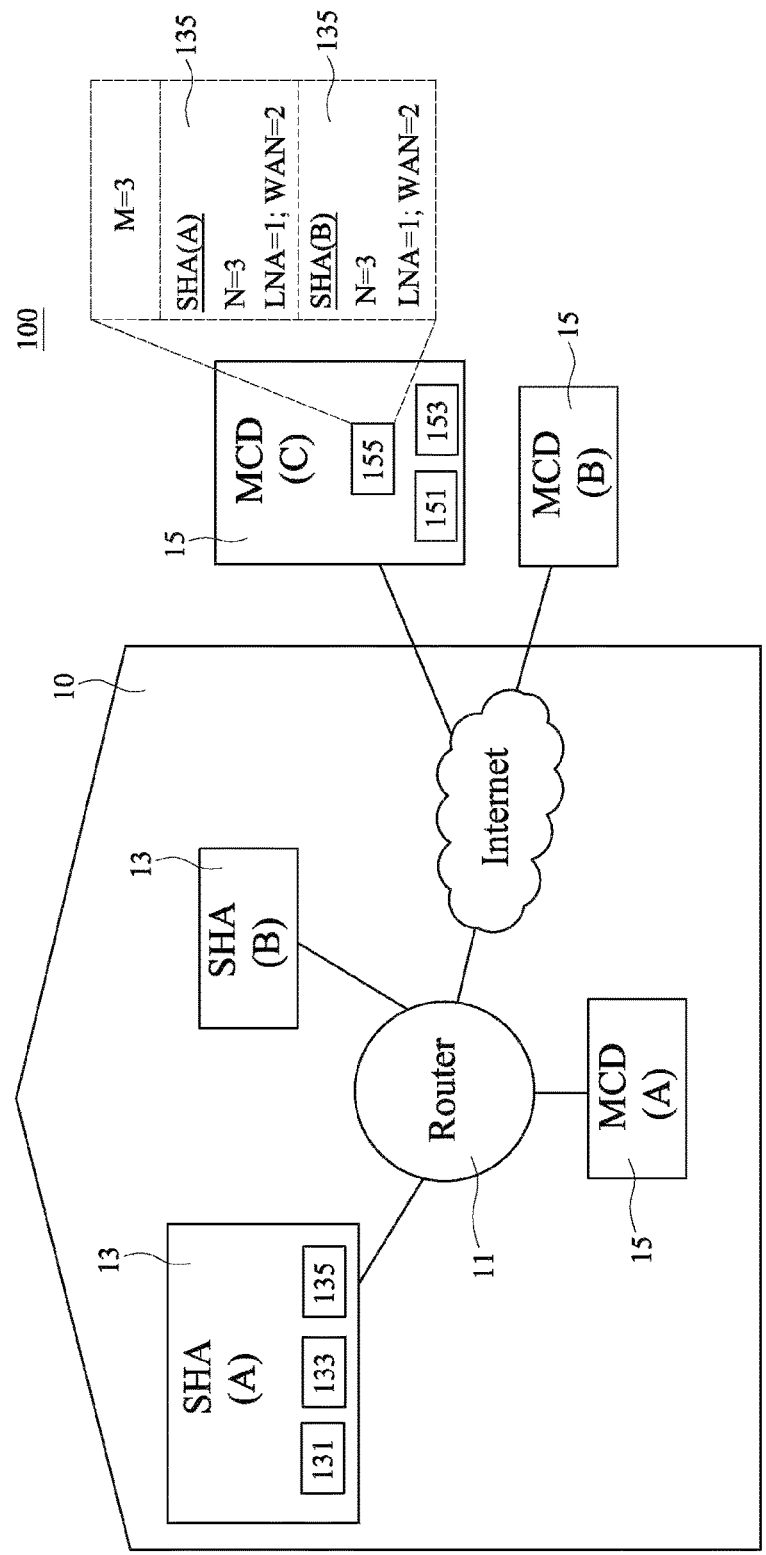
FIG. 1 is an architecture diagram of a smart household appliance control system according to one embodiment of the present invention.

Referring to FIG. 1, there is shown an architecture diagram of a smart household appliance control system according to one embodiment of the present invention. The smart household appliance control system of the present invention is used for controlling the power of smart household appliances within home environment, office environment or regional environment. As shown in FIG. 1, the smart household appliance control system 100 of the present invention comprises a router 11, at least one smart household appliance 13, and at least one mobile communication device 15. The router 11 is having wireless and wired connection functions. The smart household appliance 13 can be air-conditioner, television, dehumidifier, etc. The mobile communication device 15 can be smart phone, tablet PC, etc.

The smart household appliance 13 comprises a first local area network module 131 and a process module 133. The mobile communication device 15 comprises a second local area network module 151 and a wide area network module 153. The first local area network module 131 and the second local area network module 151 are wireless network modules, wired LAN network modules or short-distance communication network modules. The wide area network module 153 is 3G, 4G, GSM, GPRS or long-distance communication network module.

Each smart household appliance 13 is connected to the router 11 via the first local area network module 131 so as to form a regional network 10. In the present invention, the second local area network module 151 or the wide area network module 153 may be selected by the mobile communication device 15 to connect to the router 11. For example, the mobile communication device (A) is located within the wireless communication range of the router 11, and it will be connected to the router 11 via selecting the second local area network module 151; otherwise, the mobile communication devices (B), (C) are located outside the wireless communication range of the router 11, and they will be connected to the router 11 via selecting the wide area network module 153, respectively.

Furthermore, each mobile communication device 15 is configured with an application program 155, which is configured in the mobile communication device 15 by the manner of software. The mobile communication device 15 may be connected to and controlling the specified smart household appliance 13 by the using of the application program 155. In the present invention, the application program 155 of the mobile communication device 15 will be connected to the smart household appliance 13 in a local area network connection mode (LAN connection mode) when the mobile communication device 15 is connected to the router 11 via the second local area network module 151; otherwise, the application program 155 of the mobile communication device 15 will be connected to the smart household appliance 13 in a wide area network mode (WAN connection mode or called internet connection mode) when the mobile communication device 15 is connected to the router 11 via the wide area network module 153.

Sequentially, the process module 133 of each smart household appliance 13 is for recording the number (N) of connection of application programs 155 and the connection mode between each application program 155 and the smart household appliance 13 to generate a connection information 135 and transmit the connection information 135 to each mobile communication device 15. Accordingly, each connection information 135 transmitted from each corresponding smart household appliance 13 will be displayed in the user interface of the application program 155 of the mobile communication device 15. The application program 155 of the mobile communication device 15 can determine whether there is any application program 155 connected to the smart household appliance 13 in the LAN connection mode according to the indication of the connection information 135 so as to recognize whether anyone is at home or not.

Taking FIG. 1 as an example, by the indication of connection information 135, the application program 155 of the mobile communication device 15 may determine that there is one application program (such as the application program 155 of the mobile communication device A) connected to the smart household appliance 13 in the LAN connection mode and two application programs (such as the application programs 155 of the mobile communication devices B, C) connected to the smart household appliance 13 in the WAN connection mode. The application program 155 of the mobile communication device 15 may know someone at home based on the determination result that there is one application program 155 connected to the smart household appliance 13 in the LAN connection mode, and therefore it will send an enable signal to the smart household appliance 13 to turn on the power of the smart household appliance 13.

Figure 2:
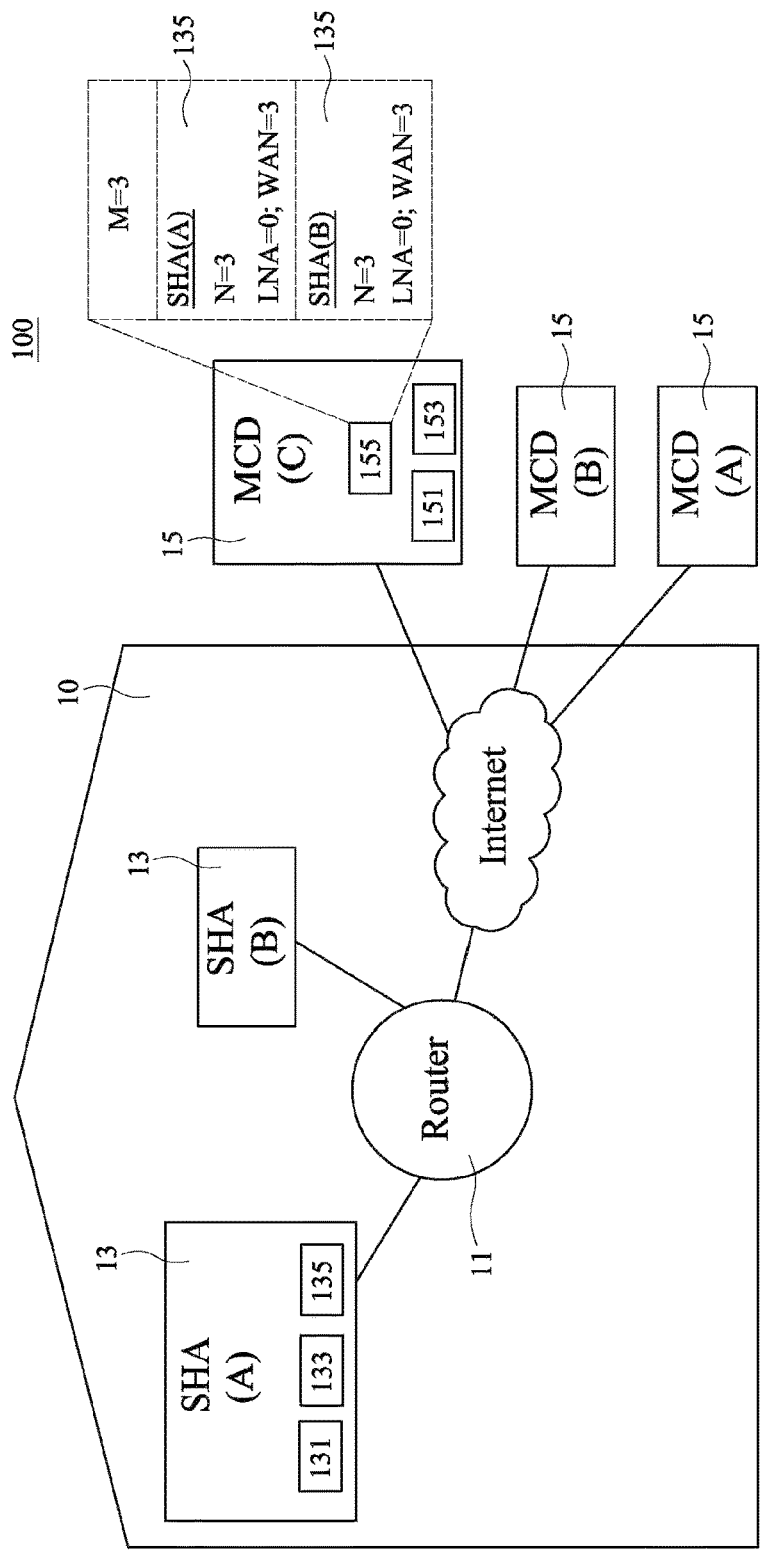
FIG. 2 is another architecture diagram of a smart household appliance control system according to another embodiment of the present invention.

On the contrary, taking FIG. 2 as another example, the application programs 155 of all mobile communication devices 15 are connected to the smart household appliance 13 in the WAN connection mode, which will be recorded in the connection information 135 by the process module 133 of the smart household appliance 13. Subsequently, the application program 155 of the mobile communication device 15 may determine that there is not any application program 155 connected to the smart household appliance 13 in the LAN connection mode according to the indication of the connection information 135, which will be recognized as nobody at home. Afterward, the application program 155 of the mobile communication device 15 will send a disable signal to the smart household appliance 13 from a remote end to turn off the power of the smart household appliance 13, in such a way that the energy consumption of the smart household appliance 13 will be reduced when nobody is at home.

In one embodiment of the present invention, the number (M) of configuration of the application programs 155 in system 100 is set in the application program 155 of each mobile communication device 15. The application program 155 of the mobile communication device 15 will further determines whether the number (N) of connection of the application programs 155 are equal to the number (M) of configuration of the application programs 155 except determining the connection mode between the application programs 155 and the smart household appliance 13. If application program 155 of the mobile communication device 15 determines that the number (N) of connection of the application programs 155 are equal to the number (M) of configuration of the application programs 155 and all application programs 155 are connected the smart household appliance 13 in WAN connection mode according to the indication of connection information 135, it will send the disable signal to the smart household appliance 13; else, it will send the enable signal to the smart household appliance 13.

For example, the application program 155 of some mobile communication device 15 (such as mobile communication device A) will be unable connected to the smart household appliance 13 when some mobile communication device (A) 15 is located at poor reception places or entered a shutdown state, in which a specific mobile communication device 15 (such as the mobile communication device C) is unable to determine that the user of some mobile communication device (A) 15 is at home or outside of home. At this time, the specific mobile communication device (C) 15 will be inhibited to send the disable signal to the smart household appliance 13 by the application programs 155 so as to avoid to turn off the power of the smart household appliance 13 in no determining whether someone is at home.

Figure 3:
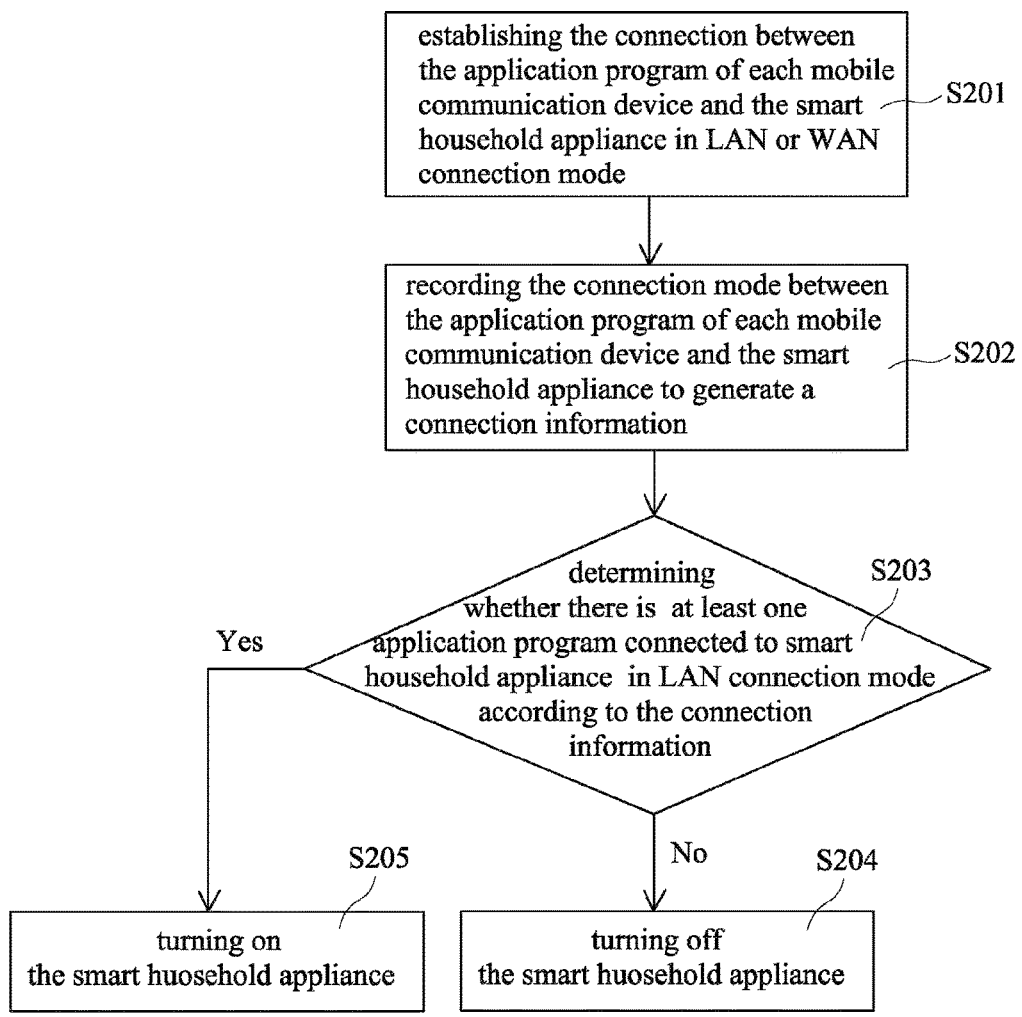
FIG. 3 is a flow chart of a method for controlling smart household appliance according to one embodiment of the present invention.

Referring to FIG. 3, there is shown a flow chart of a method for controlling smart household appliance according to one embodiment of the present invention, and also referring to FIG. 1 and FIG. 2. Firstly, executing step S201, the application program 155 of the mobile communication devices 15 is selectively connected to the smart household appliance 13 in LAN connection mode or in WAN connection mode.

In step S202, the process module 133 of the smart household appliance 13 records the connection mode between the application program 155 of each mobile communication device 15 and the smart household appliance 13 to generate a connection information 135 that is transmitted to each mobile communication device 15. In step S203, the application program 155 of the mobile communication device 15 determines whether there is at least one application program 155 connected to the smart household appliance 13 in the LAN connection mode according to the indication of the connection information 135.

If there is not any application program 155 connected to the smart household appliance 13 in LAN connection mode, executing step S204, the application program 155 of mobile communication device 15 will send a disable signal to the smart household appliance 13 to turn off the power of the smart household appliance 13. Otherwise, if there is at least one application program 155 connected to the smart household appliance 13 in LAN connection mode, executing step S205, the application program 155 of mobile communication device 15 will send an enable signal to the smart household appliance 13 to turn on the power of the smart household appliance 13.

Figure 4:
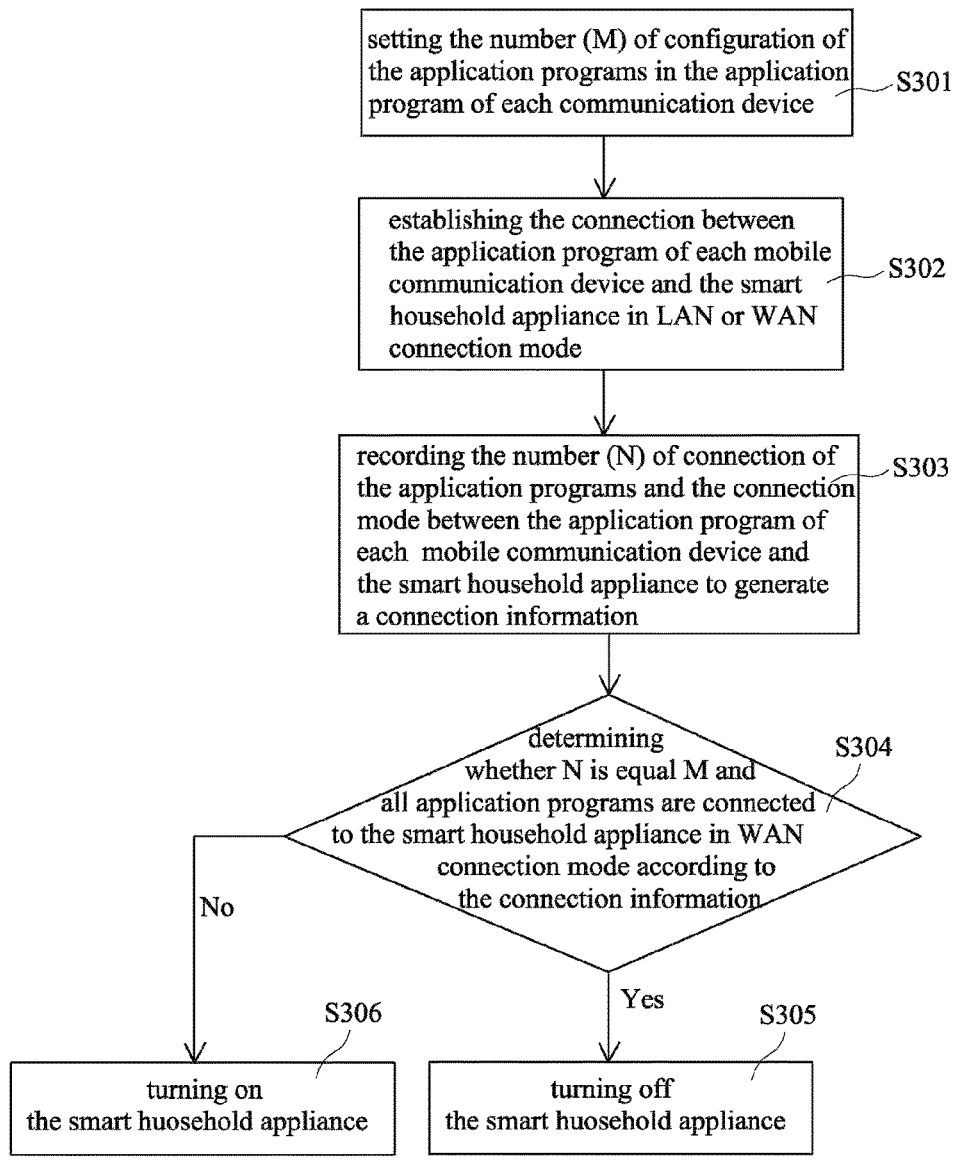
FIG. 4 is another flow chart of a method for controlling smart household appliance according to another embodiment of the present invention.

Referring to FIG. 4, there is shown another flow chart of a method for controlling smart household appliance according to another embodiment of the present invention, and also referring to FIG. 1 and FIG. 2. Firstly, executing step S301, the number (M) of configuration of the application programs 155 in the system 100 is set in the application program 155 of each mobile communication device 15.

In step S302, the application program 155 of the mobile communication devices 15 is selectively connected to the smart household appliance 13 in LAN connection mode or in WAN connection mode.

In step S303, the process module 133 of the smart household appliance 13 records the number (N) of connection of the application programs 155 and the connection mode between the application program 155 of each mobile communication device 15 and the smart household appliance 13 to generate a connection information 135 that is transmitted to each mobile communication device 15.

In step S304, the application program 155 of the mobile communication device 15 determines whether the number (N) of connection of the application programs 155 is equal to the number (M) of configuration of the application programs 155 and all application programs 155 are connected to the smart household appliance 13 in the WAN connection mode according to the indication of connection information 135. If the number (N) of connection of the application programs 155 is equal to the number (M) of configuration of the application programs 155 and all application programs 155 are connected to the smart household appliance 13 in the WAN connection mode, executing step S305, the application program 155 of mobile communication device 15 will send a disable signal to the smart household appliance 13 to turn off the power of the smart household appliance 13. Otherwise, if the number (N) of connection of the application programs 155 is not equal to the number (M) of configuration of the application programs 155 or there is at least one application program 155 connected to the smart household appliance 13 in the LAN connection mode, executing step S306, the application program 155 of mobile communication device 15 will send an enable signal to the smart household appliance 13 to turn on the power of the smart household appliance 13.

Naturally, there are still various embodiments for the present invention. It should be understood that various changes and alterations could be made to the present invention by those skilled in the art without departing from the spirit and scope of the invention, and included within the scope of the appended claims.

The invention claimed is:

1. A system for controlling smart household appliance, comprising:
   a regional network, comprising:
   a router having wireless and wired connection functions; and
   at least one smart household appliance comprising a first local area network module and a process module, and connected to said router via said first local area network module; and
   at least one mobile communication device comprising a second local area network module, a wide area network module and an application program, said mobile communication device connected to said router via said second local area network module so as to connect to said smart household appliance in a local area network connection mode when said mobile communication device located within the wireless communication range of said router, and said mobile communication device connected to said router via said wide area network module so as to connect to said smart household appliance in a wide area network connection mode when said mobile communication device located outside the wireless communication range of said router; wherein a first number is defined as the total number of said mobile communication devices configured to be operational within said system;
   wherein said process module of said smart household appliance generates a connection information for recording the connection mode between said mobile communication device and said smart household appliance, and recording a second number defined as the number of said mobile communication devices which are active and connected to said router, wherein said connection information is transmitted to said mobile communication device from said smart household appliance, when (1) said application program of said mobile communication device determines that said first number is equal to said second number, and all mobile communication devices are connected to said smart household appliance by said wide area network connection mode according to said connection information, said application program of said mobile communication device sends a disable signal to said smart household appliance to turn off the power of said smart household appliance or (2) said application program of said mobile device determines that said first number is not equal to said second number, said application program of said mobile communication device is inhibited from sending said disable signal to said smart household appliance.

2. The system according to claim 1, wherein when said application program of said mobile communication device determines that there is at least one said application program connected to said smart household appliance in said local area network connection mode according to said connection information, it will send an enable signal to said smart household appliance to turn on the power of said smart household appliance.

3. The system according to claim 1, wherein when said application program of said mobile communication device determines that said first number is not equal to said second number according to said connection information, it will send said enable signal to said smart household appliance to turn on the power of said smart household appliance.

4. The system according to claim 1, wherein said first local area network module and said second local area network module are wireless network modules, wired LAN network modules or short-distance communication network modules.

5. The system according to claim 1, wherein said wide area network module is 3G, 4G, GSM, GPRS network module or long-distance communication network module.

6. A method for controlling smart household appliance applied in a smart household appliance control system, said smart household appliance control system comprising a router, at least one smart household appliance connected to said router via the local network to form a regional network, and at least one mobile communication device comprising an application program, the method comprising:
storing a first number of said mobile communication devices that installed said application program;
establishing the connection between said mobile communication device and said smart household appliance by a local area network connection mode or by a wide area network connection mode;
generating a connection information by a process module of said smart household appliance for recording a second number defined as the number of said mobile communication devices connected to said smart household appliance, and recording the connection mode between said mobile communication devices and said smart household appliance;
transmitting said connection information to said mobile communication device by said process module of said smart household appliance; and
determining whether said first number is equal to said second number, and all mobile communication device are connected to said smart household appliance by said wide area network connection mode according to said connection information, when (1) said application program of said mobile communication device determines that said first number is equal to said second number, and all mobile communication devices are connected to said smart household appliance by said wide area network connection mode according to said connection information, said application program of said mobile communication device will send a disable signal to said smart household appliance to turn off the power of said smart household appliance or (2) said application program of said mobile device determines that said first number is not equal to said second number, said application program of said mobile communication device is inhibited from sending said disable signal to said smart household appliance.

7. The method according to claim 6, wherein if said first number is not equal to said second number, said application program of said mobile communication device will send an enable signal to said smart household appliance to turn on the power of said smart household appliance.

8. The method according to claim 6, wherein said application program of said mobile communication device will be connected to said smart household appliance by said local area network connection mode when said mobile communication device is located within the wireless communication range of said router, or said application program of said mobile communication device will be connected to said smart household appliance by said wide area network connection mode when said mobile communication device is located outside the wireless communication range of said router.

9. A smart household appliance comprising a process module, and connected to at least one mobile communication device that comprises an application program by a local area network connection mode or a wide area network connection mode, wherein a first number is defined as the total number of said mobile communication devices configured to be operational within said system, wherein said process module of said smart household appliance generates a connection information for recording the connection mode between said mobile communication device and said smart household appliance, and recording a second number defined as the number of said mobile communication devices which are active and connected to said smart household appliance, and then transmit said connection information to said mobile communication device, when (1) said application program of said mobile communication device determines that said first number is equal to said second number, and all mobile communication devices are connected to said smart household appliance by said wide area network connection mode according to said connection information, said application program of said mobile communication device sends a disable signal to said smart household appliance to turn off the power of said smart household appliance or (2) said application program of said mobile device determines that said first number is not equal to said second number, said application program of said mobile communication device is inhibited from sending said disable signal to said smart household appliance.

10. A mobile communication device, comprising an application program, and connecting to at least one smart household appliance having a process module by a local area network connection mode or a wide area network connection mode, wherein a first number is defined as the total number of said mobile communication devices configured to be operational within said system, wherein said process module of said smart household appliance generates a generates a connection information for recording the connection mode between said mobile communication device and said smart household appliance, and recording a second number defined as the number of said mobile communication devices which are active and connected to said smart household appliance, and then transmits said connection information to said mobile communication device, (1) when said application program of said mobile communication device determines that said first number is equal to said second number, and all mobile communication devices are connected to said smart household appliance by said wide area network connection mode according to said connection information, said application program of said mobile communication device sends a disable signal to said smart household appliance to turn off the power of said smart household appliance or (2) said application program of said mobile device determines that said first number is not equal to said second number, said application program of said mobile communication device is inhibited from sending said disable signal to said smart household appliance.

* * * * *